(12) United States Patent
Walsh

(10) Patent No.: US 6,562,498 B1
(45) Date of Patent: May 13, 2003

(54) FUEL CELL SYSTEM

(75) Inventor: Michael M. Walsh, Fairfield, CT (US)

(73) Assignee: Plug Power Inc., Latham, NY (US)

( * ) Notice: Subject to any disclaimer, the term of this patent is extended or adjusted under 35 U.S.C. 154(b) by 101 days.

(21) Appl. No.: 09/694,460

(22) Filed: Oct. 23, 2000

Related U.S. Application Data

(60) Provisional application No. 60/161,332, filed on Oct. 25, 1999.

(51) Int. Cl.[7] .................................................. H01M 8/02
(52) U.S. Cl. .......................................... 429/17; 429/26
(58) Field of Search ............................. 429/12, 13, 17, 429/24, 26

(56) References Cited

U.S. PATENT DOCUMENTS

| | | | |
|---|---|---|---|
| 6,007,931 A | * 12/1999 | Fuller et al. | 429/13 |
| 6,274,259 B1 | * 8/2001 | Grasso et al. | 429/13 |
| 6,303,244 B1 | * 10/2001 | Surampudi et al. | 429/17 |
| 6,329,090 B1 | * 12/2001 | McElroy et al. | 429/13 |
| 6,365,291 B1 | * 4/2002 | Margiott | 429/25 |

\* cited by examiner

*Primary Examiner*—Patrick Ryan
*Assistant Examiner*—Monique Wills
(74) *Attorney, Agent, or Firm*—Fish & Richardson PC

(57) ABSTRACT

Fuel cell systems and their methods of operation are disclosed. The fuel cell systems include a water transfer device that can be used to transfer water from one or more exhaust gas streams to an inlet gas stream.

6 Claims, 4 Drawing Sheets

FUEL CELL SYSTEM

CROSS-REFERENCE TO RELATED APPLICATION

This application claims priority under 35 U.S.C. §119 to U.S. Provisional Patent Application Ser. No. 60/161,332, filed Oct. 25, 1999, and entitled "Enthalpy Wheel For Use In Fuel Cell Power Systems," the entire contents of which are hereby incorporated by reference.

TECHNICAL FIELD

The invention relates to fuel cell systems.

BACKGROUND

A fuel cell can convert chemical energy to electrical energy by promoting a chemical reaction between two gases.

One type of fuel cell includes a cathode flow field plate, an anode flow field plate, a membrane electrode assembly disposed between the cathode flow field plate and the anode flow field plate, and two gas diffusion layers disposed between the cathode flow field plate and the anode flow field plate. A fuel cell can also include one or more coolant flow field plates disposed adjacent the exterior of the anode flow field plate and/or the exterior of the cathode flow field plate.

Each flow field plate has an inlet region, an outlet region and open-faced channels connecting the inlet region to the outlet region and providing a way for distributing the gases to the membrane electrode assembly.

The membrane electrode assembly usually includes a solid electrolyte (e.g., a proton exchange membrane, commonly abbreviated as a PEM) between a first catalyst and a second catalyst. One gas diffusion layer is between the first catalyst and the anode flow field plate, and the other gas diffusion layer is between the second catalyst and the cathode flow field plate.

During operation of the fuel cell, one of the gases (the anode gas) enters the anode flow field plate at the inlet region of the anode flow field plate and flows through the channels of the anode flow field plate toward the outlet region of the anode flow field plate. The other gas (the cathode gas) enters the cathode flow field plate at the inlet region of the cathode flow field plate and flows through the channels of the cathode flow field plate toward the cathode flow field plate outlet region.

As the anode gas flows through the channels of the anode flow field plate, the anode gas passes through the anode gas diffusion layer and interacts with the anode catalyst. Similarly, as the cathode gas flows through the channels of the cathode flow field plate, the cathode gas passes through the cathode gas diffusion layer and interacts with the cathode catalyst.

The anode catalyst interacts with the anode gas to catalyze the conversion of the anode gas to reaction intermediates. The reaction intermediates include ions and electrons. The cathode catalyst interacts with the cathode gas and the reaction intermediates to catalyze the conversion of the cathode gas to the chemical product of the fuel cell reaction.

The chemical product of the fuel cell reaction flows through a gas diffusion layer to the channels of a flow field plate (e.g., the cathode flow field plate). The chemical product then flows along the channels of the flow field plate toward the outlet region of the flow field plate.

The electrolyte provides a barrier to the flow of the electrons and gases from one side of the membrane electrode assembly to the other side of the membrane electrode assembly. However, the electrolyte allows ionic reaction intermediates to flow from the anode side of the membrane electrode assembly to the cathode side of the membrane electrode assembly.

Therefore, the ionic reaction intermediates can flow from the anode side of the membrane electrode assembly to the cathode side of the membrane electrode assembly without exiting the fuel cell. In contrast, the electrons flow from the anode side of the membrane electrode assembly to the cathode side of the membrane electrode assembly by electrically connecting an external load between the anode flow field plate and the cathode flow field plate. The external load allows the electrons to flow from the anode side of the membrane electrode assembly, through the anode flow field plate, through the load and to the cathode flow field plate.

Electrons are formed at the anode side of the membrane electrode assembly, indicating that the anode gas undergoes oxidation during the fuel cell reaction. Electrons are consumed at the cathode side of the membrane electrode assembly, indicating that the cathode gas undergoes reduction during the fuel cell reaction.

For example, when hydrogen and oxygen are the gases used in a fuel cell, the hydrogen flows through the anode flow field plate and undergoes oxidation. The oxygen flows through the cathode flow field plate and undergoes reduction. The specific reactions that occur in the fuel cell are represented in equations 1–3.

$$H_2 \rightarrow 2H^+ + 2e^- \tag{1}$$

$$1/2 O_2 + 2H^+ + 2e^- \rightarrow H_2O \tag{2}$$

$$H_2 + 1/2 O_2 \rightarrow H_2O \tag{3}$$

As shown in equation 1, the hydrogen forms protons ($H^+$) and electrons. The protons flow through the electrolyte to the cathode side of the membrane electrode assembly, and the electrons flow from the anode side of the membrane electrode assembly to the cathode side of the membrane electrode assembly through the external load. As shown in equation 2, the electrons and protons react with the oxygen to form water. Equation 3 shows the overall fuel cell reaction.

In addition to forming chemical products, the fuel cell reaction produces heat. One or more coolant flow field plates are typically used to conduct the heat away from the fuel cell and prevent it from overheating.

Each coolant flow field plate has an inlet region, an outlet region and channels that provide fluid communication between the coolant flow field plate inlet region and the coolant flow field plate outlet region. A coolant (e.g., liquid de-ionized water or other low conductivity fluids) at a relatively low temperature enters the coolant flow field plate at the inlet region, flows through the channels of the coolant flow field plate toward the outlet region of the coolant flow field plate, and exits the coolant flow field plate at the outlet region of the coolant flow field plate. As the coolant flows through the channels of the coolant flow field plate, the coolant absorbs heat formed in the fuel cell. When the coolant exits the coolant flow field plate, the heat absorbed by the coolant is removed from the fuel cell.

To increase the electrical energy available, a plurality of fuel cells can be arranged in series to form a fuel cell stack. In a fuel cell stack, one side of a flow field plate functions as the anode flow field plate for one fuel cell while the opposite side of the flow field plate functions as the cathode flow field plate in another fuel cell. This arrangement may be referred to as a bipolar plate. The stack may also include monopolar plates such as, for example, an anode coolant flow field plate having one side that serves as an anode flow field plate and another side that serves as a coolant flow field plate. As an example, the open-faced coolant channels of an anode coolant flow field plate and a cathode coolant flow field plate may be mated to form collective coolant channels to cool the adjacent flow field plates forming fuel cells.

SUMMARY

The invention relates to fuel cell systems. The fuel cell systems include a water recovery device that can transfer water from one or more fuel cell or fuel cell stack exhaust streams into a fuel cell or fuel cell stack inlet stream so that the water is recycled back into the fuel cell or fuel cell stack. This can improve fuel cell or fuel cell stack performance and/or efficiency.

In one aspect, the invention generally relates to a fuel cell system including a fuel cell stack and a water recovery device. The fuel cell stack has a cathode gas inlet, a cathode gas outlet and an anode gas outlet. The water recovery device has three different ports. One of the ports is in fluid communication with the cathode gas inlet so that at least a portion of a gas exiting this ports flows to the cathode gas inlet. Another port is in fluid communication with the cathode gas outlet so that at least a portion of a gas exiting the cathode gas outlet flows to this port. The third port is in fluid communication with the anode gas outlet so that at least a portion of a gas exiting the anode gas outlet flows to this port.

The water recovery can be, for example, an enthalpy wheel, a desiccant wheel or a sensible heat rotor.

The water recovery device can further include three additional ports arranged so that there is at least one of the additional ports between the three ports in fluid communication with the gas streams.

In some embodiments, the ports are arranged so that the port in fluid communication with the anode gas outlet is between the other two ports along the rotation path of the water recovery device.

In another aspect, the invention generally relates to a method of operating a fuel cell system that includes a fuel cell stack. The method includes flowing a cathode gas mixture to a port into a water recovery device, and flowing an outlet cathode gas into a different port in the water recovery device. The method also includes flowing an outlet anode gas into yet a different port in the water recover device.

The flow direction of the cathode gas mixture can be counter to or concurrent with the flow direction of the outlet cathode gas. The flow direction of the cathode gas mixture can be counter to or concurrent with the flow direction of the outlet anode gas.

In some embodiments, flowing the cathode gas mixture into the port forms a different cathode gas mixture different than the first cathode gas mixture. This different cathode gas mixture can have a higher water content than the cathode gas mixture that flows into the port.

The method can further include rotating the water recovery device along a rotation path so that the port into which the anode outlet gas flows is between the other two ports along the rotation path of the water recovery device.

The can further includes a cathode inlet gas and an anode inlet gas through at least a portion of the fuel cell stack to form water and electricity. The cathode inlet gas can be formed by transferring water from the outlet cathode gas mixture and/or the outlet anode gas mixture to the cathode gas mixture.

In a further aspect, the invention generally relates to a method of operating a fuel cell system including a fuel cell stack. The method includes flowing a gas mixture into a port in a water recovery device to form a different gas mixture and then flowing this gas mixture through at least a portion of the fuel cell stack to form an outlet gas. The method also includes flowing the outlet gas into a different port in the water recovery device, and flowing a different outlet gas into yet a different port in the water recover device.

In some embodiments, flowing the gas mixture into the first port forms a different gas mixture. The water content of the gas mixture so formed can be higher than that of the gas mixture that flows into the port.

In another aspect, the invention relates to a method of operating a fuel cell system that includes a fuel cell stack having a cathode gas outlet and an anode gas outlet. The method includes flowing a gas mixture (e.g., a gas mixture containing a cathode gas) from the cathode gas outlet into a water recovery device while also flowing a different gas mixture (e.g., a gas mixture containing an anode gas) from the anode gas outlet into the water recovery device without first mixing the first and second gas mixtures.

The can further include flowing a gas mixture from the water recovery device to a cathode gas inlet of the fuel cell stack.

One potential advantage of the invention is that, in certain embodiments, in addition to recovering water from the anode exhaust gas stream, the amount of energy used to humidify the reformer inlet gas stream is reduced, thereby improving the overall efficiency of the systems and methods.

Other features and advantages of the invention will be apparent from the description, the drawings and the claims.

DETAILED DESCRIPTION

Figure 1:
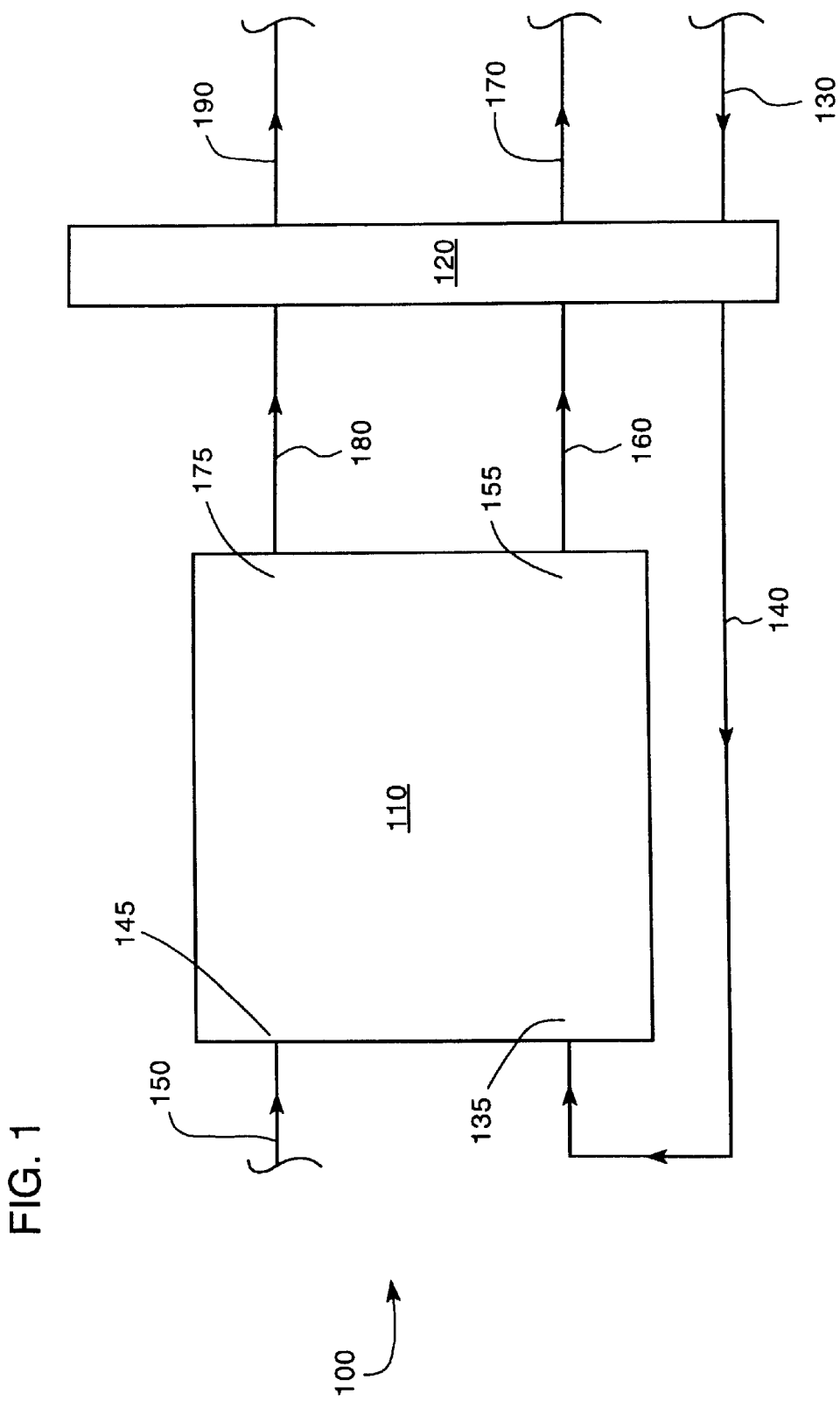
FIG. 1 is a schematic representation of an embodiment of a fuel cell system.

The invention relates to fuel cell systems. FIG. 1 shows a fuel cell system 100 including a fuel cell stack 110 and a water recovery device 120. Water recovery device 120 transfers water, such as liquid water or water vapor, from a gas mixture present in a cathode outlet gas stream 160 and/or a gas mixture present in an anode gas outlet stream 180 to a gas mixture present in a gas stream 130 to form the gas mixture present in a gas stream 140. Generally the gas mixture in gas stream 130 contains a cathode gas (e.g., air or molecular oxygen), and the gas mixture present in gas stream 140 contains the cathode gas so that gas stream 140 serves as the cathode inlet gas stream.

Water recovery device 120 can be any device capable of transferring water (e.g., liquid water or water vapor) from a gas mixture present in gas stream 160 and/or gas stream 180 to a gas mixture present in gas stream 130. In certain embodiments, water recovery device 120 transfers sensible heat and/or latent heat from a gas mixture present in gas stream 160 and/or gas stream 180 to a gas mixture present in gas stream 130.

In certain embodiments, water recovery device 120 transfers a relatively high percentage of water contained in a gas mixture present in gas stream 160 and/or gas stream 180 to a gas mixture present in gas stream 130 (e.g., at least about 65%, at least about 75%, at least about 90%).

In some embodiments, water recovery device 120 transfers a relatively low percentage of non-water species (e.g., $CO_2$) contained in a gas mixture present in gas stream 160 and/or gas stream 180 to a gas mixture present in gas stream 130.

Illustrative and nonlimiting examples of water recovery devices include enthalpy wheels, desiccant wheels and sensible heat rotors. Combinations of different water recovery devices can be used.

In some embodiments, water recovery device 120 is an enthalpy wheel. Without wishing to be bound by any theories, in general, an enthalpy wheel operates by transferring sensible heat and latent heat contained in a gas mixture present in a gas stream (e.g., gas streams 160 and/or 180) to a relatively dry gas mixture present in a gas stream (e.g., gas stream 130). Typically, an enthalpy wheel is rotationally driven and is formed of a material (e.g., acrylic fiber) which is chemically inert to de-ionized water. The material is coated with a material which acts as a water-selective molecular sieve, such as a zeolite. The mass of the enthalpy wheel transfers sensible heat from a gas mixture present one gas stream (e.g. gas streams 160 and/or 180) to a gas mixture present in a different gas stream (e.g., gas stream 130). The water-selective molecular sieve traps and transfers water, and therefore latent heat, from a gas mixture present in gas one stream (e.g., gas streams 160 and/or 180) to a gas mixture present in a different gas stream (e.g., gas stream 130). Examples of enthalpy wheels are disclosed in, for example, in co-pending and commonly owned U.S. patent application Ser. No. 09/389,958, filed on Sep. 3, 1999, and entitled, "Enthalpy Recovery Fuel Cell System," and U.S. Pat. Nos. 5,542,968; 6,007,931; and 6,013,385, all of which are hereby incorporated by reference in their entirety. Enthalpy wheels are available from, for example, Engelhardt Corp., LaRoche Air Systems, Inc. and Emprise Corp.

Figure 2:
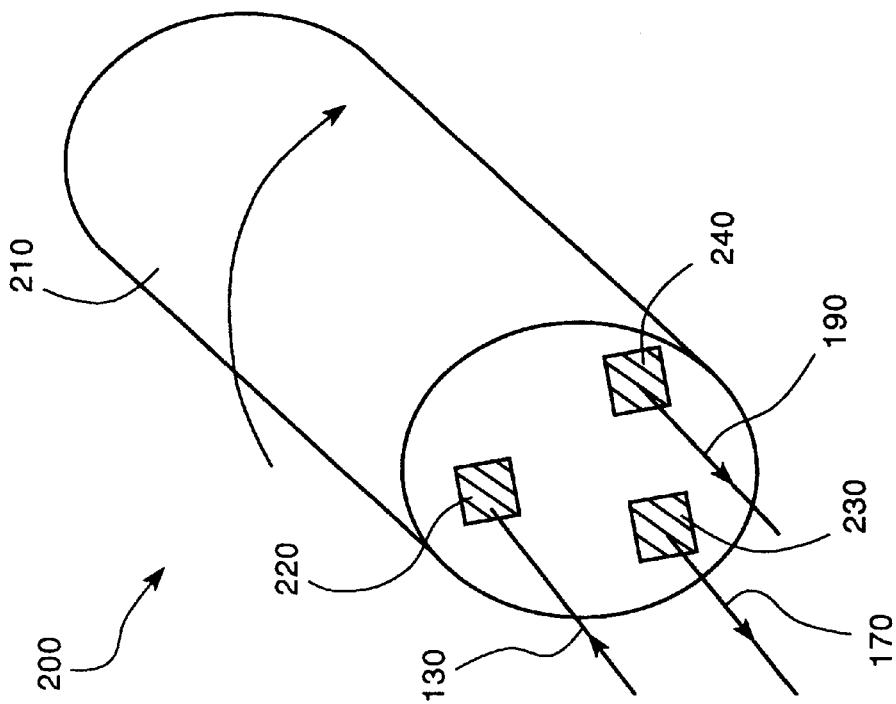
FIG. 2 is perspective view of an embodiment of an enthalpy wheel.

FIG. 2 shows an embodiment of an enthalpy wheel 200 that can be used in the systems of the invention. Enthalpy wheel 200 has a body portion 210 and ports 220, 230 and 240. While enthalpy wheel 200 rotates as indicated by the arrow, gas stream 130 flows into one end of port 220, and gas stream 140 flows out of the opposite end of port 220. At the same time, gas stream 170 flows out of one end of port 230, and gas stream 160 flows into the other end of port 230. Similarly, gas stream 190 flows out of one ends of port 240, and gas stream 180 flows into the other end of port 230. Water transfer from the gas mixtures in gas streams 160 and 180 to the gas mixture in gas stream 130 occurs as enthalpy wheel 200 rotates.

While FIG. 2 shows one configuration of the relative flow directions of the various gas streams, different relative flow directions of the gas streams can also be used. For example, the flow direction of gas stream 130 can be concurrent with the flow direction of gas stream 160 and/or the flow direction gas stream 180. The flow direction of gas stream 160 can be counter to the flow direction of gas stream 180. Combinations of these relative flow directions can be used.

In some embodiments, it may desirable to minimize the amount of anode gas in the gas mixture present in gas stream 180 that is transferred to gas stream 170. For example, if gas stream 170 is fed into an anode tailgas oxidizer (see description of FIG. 4 below), having a relatively small amount of anode gas present in gas stream 170 can reduce the risk of an exothermic reaction hydrogen and oxygen in gas stream 170 as it heats up as it approaches the anode tailgas oxidizer. In these embodiments, the ports in enthalpy wheel 200 can be arranged as shown in FIG. 2. In this arrangement, the gas mixture in gas stream 180 follows the gas mixture in cathode exhaust stream 160, thereby reducing the amount of anode gas present in gas stream 180 that is transferred to gas stream 170.

While FIG. 2 shows an embodiment of the relative positioning of the ports in enthalpy wheel 200, the ports can be arranged in other configurations as well. For example, port 220 can be positioned so that it is between ports 230 and 240 along the rotation path of enthalpy wheel 200. Alternatively, port 230 can be positioned so that it is between ports 220 and 240 along the rotation path of enthalpy wheel 200. This configuration may be used, for example, when it is desirable to minimize the amount of anode gas present in gas stream 180 that is transferred to gas stream 140.

Figure 3:
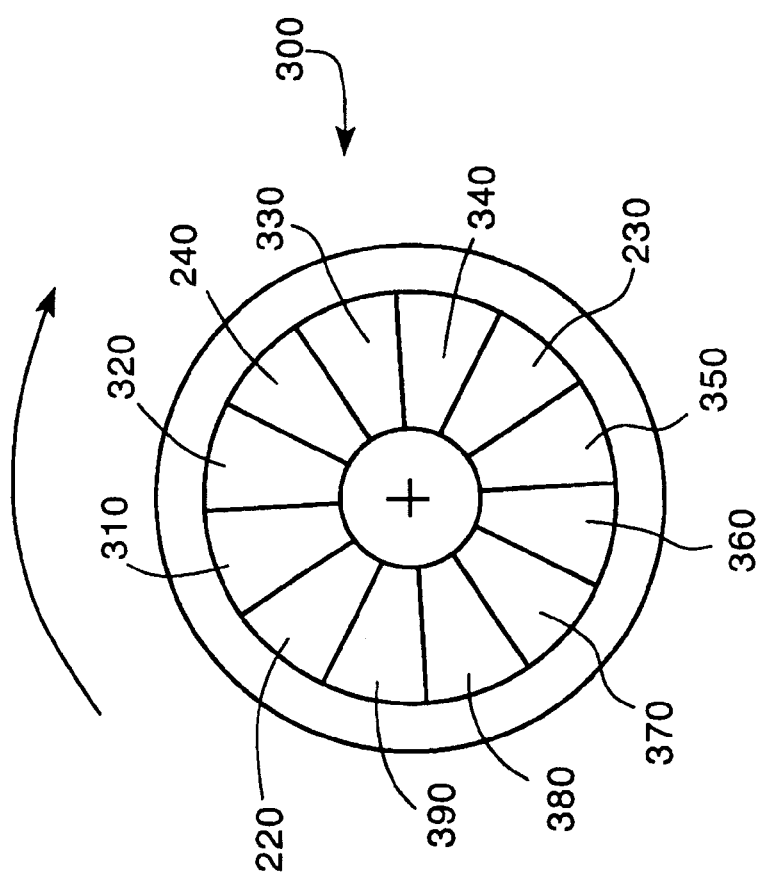
FIG. 3 is a cross-sectional view of an embodiment of an enthalpy wheel.

In some embodiments, the amount of non-water gaseous species transferred between gas mixtures present in ports 220, 230 and 240 can be reduced by placing one or more ports between ports 220, 230, 240. FIG. 3 shows an embodiment of an enthalpy wheel 300 having ports 220, 230 240, 310, 320, 330, 340, 350, 360, 370, 380 and 390. The ports located between ports 220, 230 and 240 are not intended to be used to transfer water from gas streams 160 and/or 180 to gas stream 130. While FIG. 3 shows an embodiment of an enthalpy wheel, other embodiments are also possible. For example, the enthalpy wheel can be designed so that only one or two ports are present between ports 220, 230 and/or 240. The enthalpy wheel can also be arranged so that more than three ports are present between ports 220, 230 and/or 240. Combinations of these arrangements can be used.

In certain embodiments, water recovery device 120 is a desiccant wheel. Usually, a desiccant wheel is relatively heavily loaded with a desiccant material (e.g., relative to an enthalpy wheel) and turns relatively slowly (e.g., relative to an enthalpy wheel). In general, desiccants are materials that adsorb water and materials that absorb water. Typically, energy, such as heat (e.g., electric heat, steam heat and/or waste heat), is added to a desiccant to desorb water. Without wishing to be bound by theory, in general, absorbent desiccants go through a chemical change as they attract and retain water, whereas adsorbent desiccants hold water molecules in pores at their surface without chemical change (e.g., in pores present at the surface of the adsorbent desiccant). Absorbent desiccants include, for example, alkali salts, such as lithium chloride. Examples of adsorbent desiccants include activated carbons, silica gel, activated aluminas, zeolites and clays. Desiccants are also disclosed, for example, in U.S. Pat. Nos. 5,542,968 and 6,007,931.

In some embodiments, water recovery device 120 is a sensible heat rotor. A sensible heat rotor can be used in combination with, for example, a desiccant wheel so that the sensible heat rotor can further reduce the temperature of the gas mixture in gas streams 170 and/or 190 which can allow additional condensate to drop out of gas streams 170 and/or 190 (e.g., by first passing gas streams 160 and/or 180 into a desiccant wheel and then passing gas streams 180 and/or 190 into a sensible heat rotor).

During operation of system 100, cathode gas inlet stream 140 enters stack 110 at a cathode inlet 135, and an anode gas inlet stream 150 containing an anode gas (e.g., hydrogen) enters stack 110 at an anode inlet 145. The cathode gas and anode gas flow through fuel cell stack 110 and react to form water and electricity. Cathode gas exhaust stream 160 exits stack 110 at a cathode outlet 155 and flows into water recovery device 120 where water is transferred from the gas mixture contained in gas stream 160 to water recovery device 120 and then into gas stream 170. Anode gas exhaust stream 180 exits stack 110 at an anode outlet 175 and flows into water recovery device 120 where water is transferred from the gas mixture contained in gas stream 180 to water recovery device 120 and then into gas stream 190.

Fuel cell system 100 can be operated in either draw-through mode or blow-through mode. In draw-through mode, blowers are placed within system 100 so that the cathode gas is drawn through fuel cell stack 110 and water recovery device 120. In blow-through mode, blowers are placed within system 100 so that the cathode gas is blown through fuel cell stack 110 and water recovery device 120. In some embodiments, using draw-through mode is preferred because the three gas streams passing through water recovery device 120 are at a pressure that is about the same as atmospheric pressure, thereby reducing cross-leaking of the gas mixtures present in the different gas streams in water recovery device 120.

Figure 4:
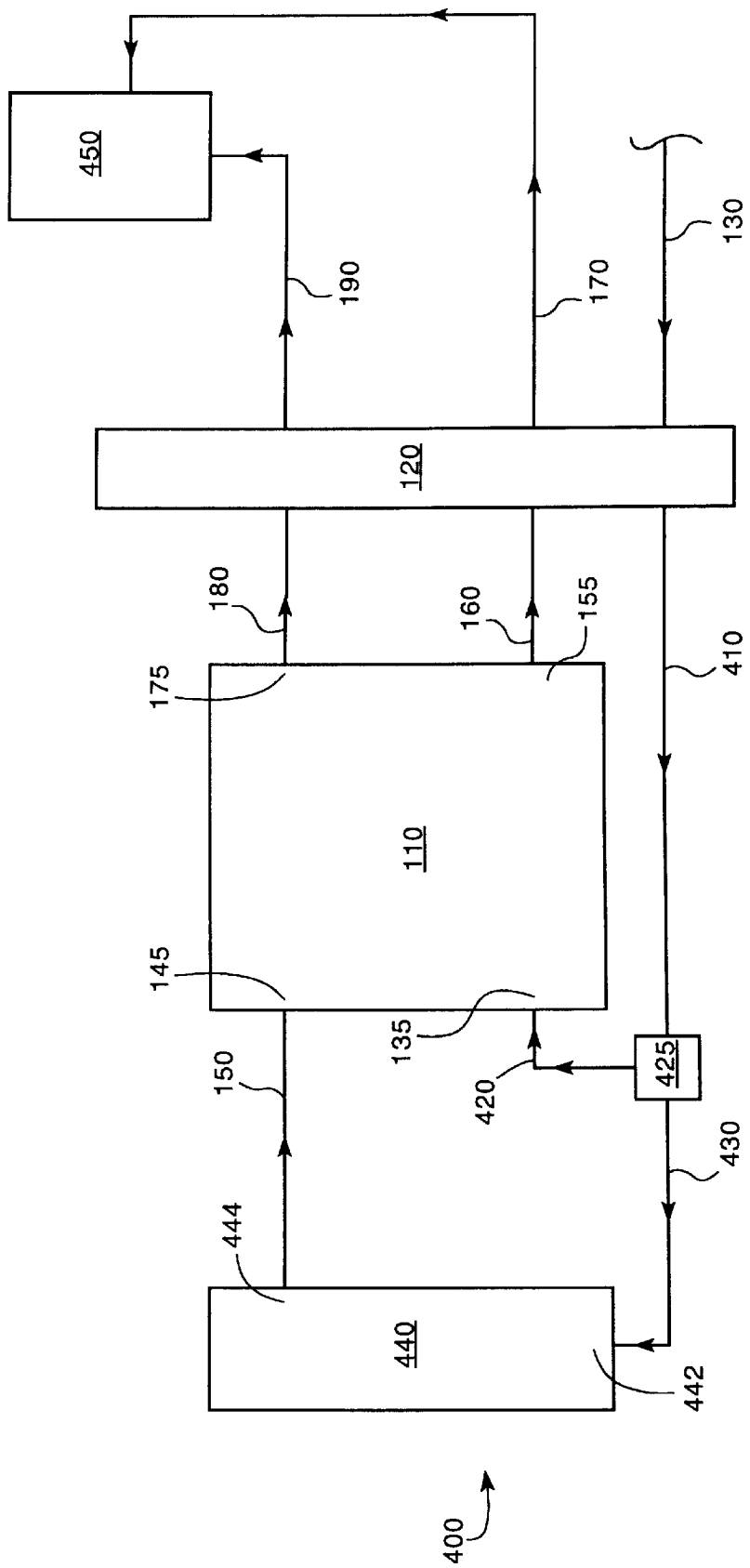
FIG. 4 is a schematic representation of an embodiment of a fuel cell system.

FIG. 4 shows an embodiment of a fuel cell system 400 containing water recovery device 120. System 400 also includes a gas stream splitting device 425, a reformer 440 and an anode tailgas oxidizer 450. Gas stream 410 flows from water recovery device 120 and is split into a cathode gas inlet stream 420 and a reformer inlet stream 430 by device 425 (e.g., a 3-way valve). The gas mixture in gas stream 410 enters fuel cell stack 110 at cathode inlet 135, and the gas mixture in gas stream 430 enters reformer 440 at an inlet 442.

After entering reformer 440, the cathode gas from gas stream 430 reacts with hydrocarbons to form hydrogen and oxidized gaseous carbon species (e.g., carbon monoxide and carbon dioxide). The hydrogen exits reformer 440 at an outlet 444 and becomes a component of the gas mixture in anode gas inlet stream 150.

The gas mixtures contained in gas streams 170 and 190 flow to anode tailgas oxidizer 450 and are reacted to oxidize hydrogen present in the gas mixture in gas stream 190.

Similar to fuel cell system 100, fuel cell system 400 can be operated in either draw-through mode or blow-through mode.

While certain embodiments of the invention have been described herein, the invention is not limited to these embodiments. For example, in certain embodiments, more than one port can be used for each gas stream. One or more water separators can be disposed within a fuel cell system. For example, one or more liquid water separators can be disposed between the water recovery device and the cathode inlet. In some embodiments, the liquid water separator(s) can be disposed at a point after the cathode gas stream from the water recovery device is split into a gas stream going to the reformer and a gas stream going to the cathode inlet. This can be advantageous because it allows for humidification of the reformer inlet. In addition, the fuel cell system can include a water recovery device that transfers water from one or more exhaust gas streams to an anode gas inlet stream. Moreover, in some embodiments, the gas mixture contained in the gas stream flowing from the anode outlet is combusted before flowing into the water recovery device (e.g., a combustion device is disposed along the flow path from the anode outlet to the water recovery device).

Other embodiments are in the claims.

What is claimed is:

1. A fuel cell system, comprising:
   a fuel cell stack having a cathode gas inlet, a cathode gas outlet and an anode gas outlet;
   a water recovery device having first, second and third ports, the first port being different than the second and third ports, the second port being different than the third port,
   wherein the first port is in fluid communication with the cathode gas inlet so that at least a portion of a gas exiting the first port flows to the cathode gas inlet, the second port is in fluid communication with the cathode gas outlet so that at least a portion of a gas exiting the cathode gas outlet flows to the second port, and the third port is in fluid communication with the anode gas outlet so that at least a portion of a gas exiting the anode gas outlet flows to the third port.

2. The fuel cell system of claim 1, wherein the water recovery device comprises a device selected from the group consisting of an enthalpy wheel, a desiccant wheel and a sensible heat rotor.

3. The fuel cell system of claim 1, wherein the water recovery device comprises an enthalpy wheel.

4. The fuel cell system of claim 1, wherein the water recovery device further includes fourth, fifth and sixth ports arranged so that there is at least one port between each of the first, second and third ports.

5. The fuel cell system of claim 1, wherein the water exchange device comprises an enthalpy wheel having fourth, fifth and sixth ports arranged so that there is at least one port between the first, second and third ports.

6. The fuel cell system of claim 1, wherein the third port is between the first and second ports along a rotation path of the water recovery device.

* * * * *